(12) United States Patent
Rittiger

(10) Patent No.: US 8,169,197 B2
(45) Date of Patent: May 1, 2012

(54) DEVICE FOR DAMPING CONTROL OF MECHANICAL TORSIONAL OSCILLATIONS OF AN ELECTRICAL ALTERNATING CURRENT GENERATOR OF MULTI-PHASE POWER SUPPLY SYSTEM

(75) Inventor: Jürgen Rittiger, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 435 days.

(21) Appl. No.: 12/440,476

(22) PCT Filed: Sep. 7, 2006

(86) PCT No.: PCT/DE2006/001600

§ 371 (c)(1),
(2), (4) Date: Mar. 9, 2009

(87) PCT Pub. No.: WO2008/028436

PCT Pub. Date: Mar. 13, 2008

(65) Prior Publication Data

US 2010/0019739 A1    Jan. 28, 2010

(51) Int. Cl.
*H02P 11/00* (2006.01)
*H02P 9/14* (2006.01)
*H02K 11/00* (2006.01)

(52) U.S. Cl. .................. 322/24; 322/29; 322/46; 322/58

(58) Field of Classification Search .............. 322/24, 322/29, 46, 58
See application file for complete search history.

(56) References Cited

U.S. PATENT DOCUMENTS

| 4,377,780 | A * | 3/1983 | Bjorklund ................ 322/29 |
| 5,999,422 | A | 12/1999 | Göransson et al. |
| 7,145,262 | B2 * | 12/2006 | Kikuchi et al. ............ 290/44 |
| 2005/0017512 | A1 | 1/2005 | Kikuchi et al. |
| 2005/0063202 | A1 * | 3/2005 | Stancu et al. ............. 363/40 |
| 2006/0232250 | A1 | 10/2006 | Sihler et al. |

FOREIGN PATENT DOCUMENTS

| DE | 3019952 A1 | 12/1980 |
| EP | 1507331 A2 | 2/2005 |
| JP | 2000224896 A | 8/2000 |
| JP | 2005045849 A | 2/2005 |
| WO | 9821924 A2 | 5/1998 |

* cited by examiner

*Primary Examiner* — Quyen Leung
*Assistant Examiner* — Jose Gonzalez Quinones
(74) *Attorney, Agent, or Firm* — Laurence A. Greenberg; Werner H. Stemer; Ralph E. Locher

(57) ABSTRACT

A device for damping control of mechanical torsional oscillations of an electrical alternating current generator connected to a multi-phase power supply system, includes a controllable converter of an HVDC installation connected to the power supply system, a measurement and filter device for detection of a frequency-dependent signal in a frequency range of the torsional oscillations of the alternating current generator and a correction apparatus for correction of a control signal for the converter for the HVDC installation. The correction apparatus includes a single phase correction filter for correction of a phase frequency response of the frequency-dependent signal. The control signal is formed by a current nominal value of a current regulator of the converter or a triggering angle of the nominal valve and with the phase correction filter is configured to take a transfer function of the current regulator into account.

5 Claims, 3 Drawing Sheets

DEVICE FOR DAMPING CONTROL OF MECHANICAL TORSIONAL OSCILLATIONS OF AN ELECTRICAL ALTERNATING CURRENT GENERATOR OF MULTI-PHASE POWER SUPPLY SYSTEM

BACKGROUND OF THE INVENTION

Field of the Invention

The invention relates to a device for damping control of mechanical torsional oscillations of an electrical alternating-current generator of a three-phase power supply system to which a converter, which is provided with a current regulator and a control device, of an HVDCT installation is connected, having a measurement and filter device for detection of a measurement signal which contains torsional oscillation frequencies of the alternating-current generator, and having a correction apparatus, which is connected downstream from the measurement and filter device, for correction of a control signal for the control device of the converter of the HVDCT installation.

One such device is known from German patent specification DE 30 19 952 C2. The disclosed device is provided for damping mechanical torsional oscillations of an alternating-current generator which is connected to a three-phase power supply system, in which case the torsional oscillations can be excited by a converter, which is likewise connected to the three-phase power supply system, of an HVDCT installation. The arrangement comprises a tachometer generator with a bandpass filter connected downstream as a measurement and filter device, with the tachometer generator being designed to detect a measurement signal, which contains torsional oscillation frequencies of the alternating-current generator, in the form of rotation-speed variations of a drive shaft of the alternating-current generator, and with the bandpass filter filtering out of the signal of the tachometer generator a frequency range which corresponds to the frequency range of the torsional oscillations of the alternating-current generator, for further processing as a measurement signal in the frequency range of the torsional oscillations. This measurement signal is supplied to a downstream correction apparatus which corrects a trigger angle of the converter of the HVDCT installation as a control signal when the measurement signal contains torsional oscillation frequencies. The trigger angle of the converter in the HVDCT installation is in this case influenced directly and exclusively by the proposed arrangement in DE 30 19 952 C2.

BRIEF SUMMARY OF INVENTION

The object of the present invention is to design a device of the type mentioned initially so as to allow damping of the mechanical torsional oscillations, including the current regulator.

According to the invention, this object is achieved in the case of a device of the type mentioned initially in that the correction apparatus has a phase correction filter which is connected to the input of the current regulator of the converter and is designed to take account of a transfer function of the current regulator, which is connected to the control device via a trigger angle transmitter.

A correction apparatus designed in this way allows damping control of the mechanical torsional oscillations in a manner contrary to the details in DE 30 19 952 C2. According to these details, damping control via upstream current or power regulators is not possible because of their phase shift, and does not lead to the desired damping of the torsional oscillations.

In one preferred embodiment, the single phase correction filter is a broadband phase correction filter. A broadband phase correction filter such as this makes it possible to damp the torsional oscillations in a particularly simple manner because a standard configuration of the broadband phase correction filter allows adequate damping of different torsional oscillations.

In a further preferred refinement, the phase correction filter is connected to the trigger angle transmitter via a transmission element, with the transfer function of the transmission element corresponding to the transfer function of the current regulator. A design such as this of the further transmission element advantageously allows selection between a preset trigger angle nominal value and a current nominal value of the current regulator of the converter.

The invention also relates to a method for damping control of mechanical torsional oscillations of an electrical alternating-current generator of a three-phase power system to which a converter, which is provided with a current regulator and a control device, of an HVDCT installation is connected, having a measurement and filter device for detection of a measurement signal which contains torsional oscillation frequencies of the alternating-current generator, and having a correction apparatus, which is connected downstream from the measurement and filter device, for correction of a control signal for the control device of the converter of the HVDCT installation.

A method such as this is known from German patent specification DE 30 19 952 C2, which has already been mentioned above.

The object of the present invention is to develop a method such as this in such a way that precise damping control is achieved.

In the case of a method such as this, the invention achieves this object in that a signal whose phase has been corrected taking account of a transfer function of a current regulator is produced by means of a phase correction filter in the correction apparatus, and the phase-corrected signal is supplied to a trigger angle transmitter via the current regulator and/or via a transmission element having a transfer function which corresponds to the transfer function of the current regulator.

A method such as this is particularly advantageous because the consideration of the transfer function of the current regulator in the phase correction filter means that a single phase correction filter is sufficient to supply the phase-corrected signal to the current regulator and/or to the trigger angle transmitter as well.

BRIEF DESCRIPTION OF THE SEVERAL VIEWS OF THE DRAWING

The invention will be explained in more detail in the following text using the drawing and one exemplary embodiment, with reference to the attached figures, in which.

DESRIPTION OF THE INVENTION

Figure 1:
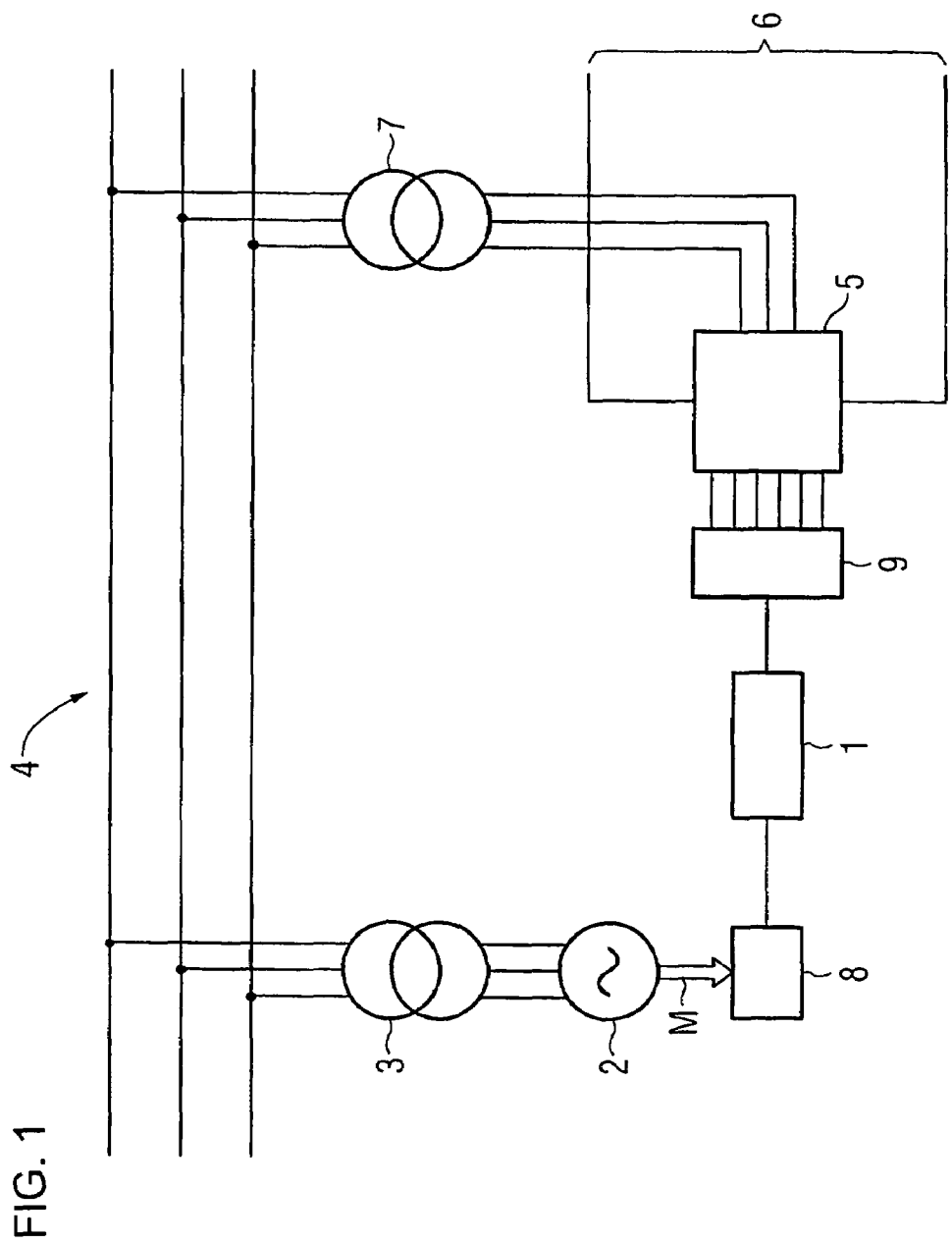
FIG. 1 shows a schematic illustration of a three-phase power supply system with a generator connected therein and a converter of an HVDCT installation, and one exemplary embodiment of a device according to the invention for damping control.

FIG. 1 shows a correction apparatus 1 for damping control of mechanical torsional oscillations of an electrical alternating-current generator 2 which, in the exemplary embodiment, is connected by means of a transformer 3 to a three-phase power supply system 4. A converter 5 of an HVDCT installation 6 is likewise connected to the three-phase power supply system 4. In this case, the converter 5 is likewise connected on the alternating-current side via a transformer 7 to the three-phase power supply system 4. In an arrangement such as this of an alternating-current generator 2 and converter 5 in an HVDCT installation 6, mechanical resonant frequencies of generator shafts of the alternating-current generator 2 can be excited and, unless further countermeasures are taken, can lead to fracturing of the shaft of the alternating-current generator 2. In order to prevent this, a measurement and filter device 8 is provided, which is designed to detect a measurement signal M in a frequency range of the natural frequencies or resonant frequencies of the torsional oscillations of the shaft of the generator 2. The measurement signal M detected by the measurement and filter device 8 has its phase/frequency response corrected by means of the correction apparatus 1, and it is supplied to a control device 9 for the converter 5, as a result of which the converter 5 is controlled such that no resonant frequencies and therefore no torsional oscillations of the generator are excited, or such that the torsional oscillations are damped by means of the correction apparatus 1 and the control device 9.

Figure 2:
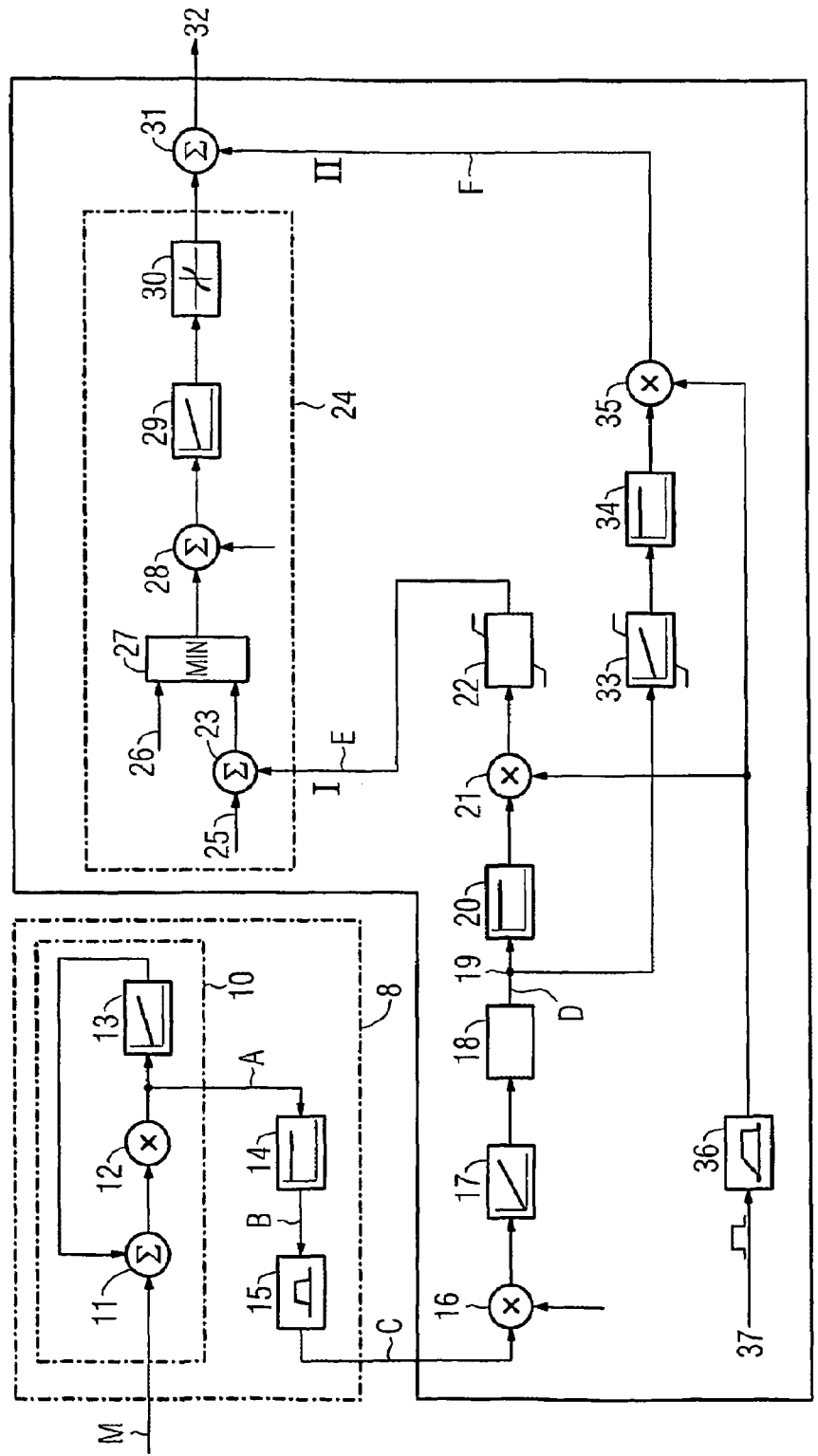
FIG. 2 shows one exemplary embodiment of a device according to the invention for damping control.

FIG. 2 shows a detailed illustration of the device for damping control with a measurement and filter device 8 and the correction apparatus 1. The measurement and filter device 8 is designed to detect and preprocess the measurement signal M from the alternating-current generator 2 and for this purpose has a phase-locked loop 10 with an adder 11, a multiplier 12 and a feedback element 13, an amplitude matching device 14, and a bandpass filter 15. The correction apparatus 1 comprises phase-shifting and integrating elements 16 and 17 as well as a broadband phase correction filter 18, which will be explained in more detail further below with reference to FIG. 3. A signal D which has been corrected by means of the phase correction filter 18 is made available at the tapping point 19 to two different control paths. A first control path comprises limiting and amplification elements 20, 21 and 22 as well as an adder 23 of a current regulator 24 for controlling the converter 5 as shown in FIG. 1. The modified signal E is supplied to an adder 23 of the current regulator 24, together with a reference current 25. A selection element 27 is connected on the output side to a control element 29 via a further adder 28. The control element 29 is designed to control the current of the converter 5 of the HVDCT installation 6. After linearization 30, a trigger angle nominal value transmitter 31 is provided in order to output a signal to the controller 9 for the HVDCT converter 5.

A second control path is provided at the tapping point 19 and, via a transmission element 33 as well as amplification and coupling elements 34 and 35, emits to the trigger angle transmitter 31 a signal F, which is obtained from the frequency-dependent signal D, in order to control the trigger angle of the thyristors in the converter 5. The transmission element 33 in this case has the same transfer function as the current regulator 24 and, in the exemplary embodiment, is in the form of a PI regulator.

Each of the coupling elements 21 and 35 is connected to a deactivation device 36, 37, which is designed to render the phase correction filter 8 inoperative during and shortly after system faults, with a suitable time constant.

Figure 3:
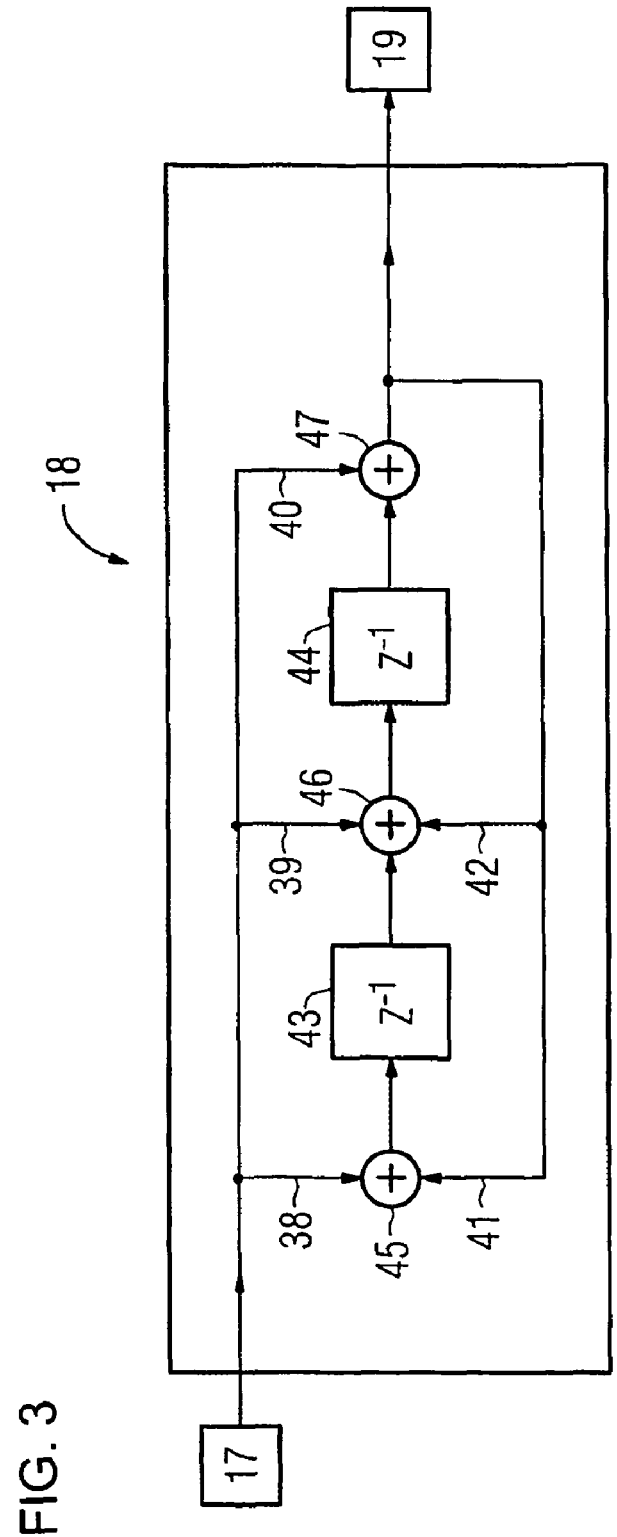
FIG. 3 shows a control element for one exemplary embodiment of a phase correction filter for the device according to the invention.

FIG. 3 shows the broadband phase correction filter 18 as shown in FIG. 2, in the form of a detail illustration, with the phase correction filter being a second-order digital IIR filter, as is known per se from signal processing. Suitably set filter coefficients 38, 39, 40, 41, 42, by means of which the signal is processed via the delay elements 43, 44 and the adders 45, 46, 47 and feedback paths to the delay elements 41, 42, make it possible to use a digital IIR filter such as this for broadband damping throughout the entire frequency range in which those torsional oscillations of the generator 2 which are relevant for subsynchronous resonances with converters lie.

The damping control method will be explained in more detail in the following text. The phase-locked loop 10 is intended and designed for synchronization of the HVDCT converter 5 to a power supply system frequency in the three-phase power supply system 4. The measurement signal M is for this purpose used as an input signal to the phase-locked loop 10. When mechanical torsional oscillations of the alternating-current generator 2 occur, this measurement signal M will contain the frequencies of the torsional oscillations. The output signal A from the phase-locked loop 10 in this case corresponds essentially to the discrepancy between the synchronization of the HVDCT converter 5 and the power supply system frequency in the three-phase power supply system 4. The bandpass filter 15 is intended to limit a matched-amplitude signal B to the range in which the resonant frequencies of the torsional oscillations lie. This signal C, which is limited to the frequency range in which the frequencies of the torsional oscillations lie, is supplied to the correction apparatus 1 which, when torsional oscillation frequencies are present, damps these frequencies and this thus results in damping of the mechanical torsional oscillations of the shaft of the alternating-current generator 2 from FIG. 1.

The signal D, which has been corrected by the correction apparatus 1 and in particular the broadband phase correction filter 18, is supplied, after further limiting 20, 22, as a modified signal E at the adder 23 of the current regulator 24, together with a reference current 25, to the selection element 27, whose second input 26 is connected to the controller 9. The control element 29 in this case uses the current 26, which is predetermined by the controller, and the reference current 25 as well as the frequency-dependent signal D and/or the modified signal E of the phase correction filter 18 to control the power drawn from the three-phase power supply system 4 in order to produce the current in the HVDCT power supply system 6, by calculating suitable trigger angles for driving the thyristors in the converter 5. The calculated values of the current regulator 24 are emitted to a trigger angle transmitter 31 in order to emit the trigger angle to the thyristors in the converter 5. The current regulator 24 therefore allows indirect control and damping of the torsional oscillations of the generator 2, taking account of the corrected signal of the phase correction filter 18, because the frequency-dependent signal of the phase correction filter 18 is used as an input variable for the control path of the current regulator 24.

The filter coefficients 38, 39, 40, 41, 42 are in this case standard parameters which are obtained from the given configuration and in particular from mechanical characteristics of the alternating-current generator. These filter coefficients allow the IIR filter 18 to provide damping in the frequency range between 10 and 30 Hz, with torsional oscillation frequencies of alternating-current generators typically lying in this frequency range, and which can become unstable as a result of HVDCT converters. Suitable matching in the case of relatively low or relatively large torsional oscillation frequencies can be achieved in a simple manner by varying the filter coefficients 38, 39, 40, 41, 42. This broadband phase correction filter 18 does not damp one specific torsional oscillation frequency particularly well but in fact makes it possible to adequately damp all the torsional oscillation frequencies in the entire frequency band, in the exemplary embodiment between 10 and 30 Hz, in such a way as to prevent the alternating-current generator 2 from being influenced by the converter 5 in the HVDCT installation 6.

The method for damping control of mechanical torsional oscillations of the electrical alternating-current generator 2 in the three-phase power supply system 4 in which the converter 5, which is provided with a control device 9, of the HVDCT installation is connected, therefore provides the measurement and filter device 8 for detection of the measurement signal which contains torsional oscillation frequencies of the alternating-current generator 2, and the correction apparatus 1, which is connected downstream from the measurement and filter device, is designed for correction of the control signal S for the control device 9 of the converter, for the converter 5 in the HVDCT installation. The signal whose phase has been corrected by means of the phase correction filter 18 in the correction apparatus 1 taking account of the transfer function of the current regulator 24, is produced and is supplied to a trigger angle transmitter 31 via the current regulator 24 or via a transmission element 34 with a transfer function which corresponds to the transfer function of the current regulator 24.

The invention claimed is:

1. A device for damping control of mechanical torsional oscillations of an electrical alternating-current generator of a multi-phase power supply system to which a converter of an HVDC installation is connected, the device comprising:
   a current regulator for the converter of the HVDC installation, said current regulator having an input and a transfer function;
   a control device for the converter of the HVDC installation;
   a measurement and filter device for detecting a measurement signal containing torsional oscillation frequencies of the alternating-current generator;
   a correction apparatus connected downstream of said measurement and filter device for correcting a control signal for said control device;
   said correction apparatus having a phase correction filter connected to said input of said current regulator, said phase correction filter configured to take said transfer function of said current regulator into account; and
   a trigger angle transmitter connected between said current regulator and said control device.

2. The device according to claim 1, wherein said phase correction filter is a broadband phase correction filter.

3. The device according to claim 1, which further comprises a transmission element connected between said phase correction filter and said trigger angle transmitter, said transmission element having a transfer function corresponding to said transfer function of said current regulator.

4. A method for damping control of mechanical torsional oscillations of an electrical alternating-current generator of a multi-phase power supply system to which a converter of an HVDC installation is connected, the method comprising the following steps:
   providing a control device for the converter of the HVDC installation;
   detecting a measurement signal containing torsional oscillation frequencies of the alternating-current generator, with a measurement and filter device;
   correcting a control signal for the control device, with a correction apparatus connected downstream of the measurement and filter device;
   producing a signal with a phase correction filter in the correction apparatus, the phase correction filter correcting a phase of the signal by taking a transfer function of a current regulator into account; and
   supplying the phase-corrected signal to a trigger angle transmitter through the current regulator or through a transmission element having a transfer function corresponding to the transfer function of the current regulator.

5. The method according to claim 4, wherein the phase-corrected signal is supplied to the trigger angle transmitter through the transmission element having the transfer function corresponding to the transfer function of the current regulator.

* * * * *